United States Patent
Murase et al.

(10) Patent No.: US 7,240,348 B2
(45) Date of Patent: Jul. 3, 2007

(54) SUSPENDING SCENARIO GENERATION METHOD, SERVER DEVICE, AND PROGRAM THEREFOR

(75) Inventors: Atsushi Murase, Sagamihara (JP);
Yukinori Sakashita, Yamato (JP);
Masahide Sato, Noda (JP); Yusuke Izumida, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 378 days.

(21) Appl. No.: 10/899,147

(22) Filed: Jul. 27, 2004

(65) Prior Publication Data
US 2006/0184945 A1    Aug. 17, 2006

(30) Foreign Application Priority Data
May 18, 2004    (JP) ............... 2004-147482

(51) Int. Cl.
*G06F 9/48* (2006.01)
*G06F 9/44* (2006.01)
*G06F 15/177* (2006.01)
*G06F 9/00* (2006.01)
*G06F 3/01* (2006.01)

(52) U.S. Cl. ............ 718/102; 718/100; 709/223; 709/206; 715/747; 715/752; 715/704

(58) Field of Classification Search ........ 718/100–108; 715/500–867; 709/223, 206
See application file for complete search history.

(56) References Cited

U.S. PATENT DOCUMENTS

| | | | |
|---|---|---|---|
| 5,778,224 A | 7/1998 | Tobe et al. | |
| 5,978,830 A | 11/1999 | Nakaya et al. | |
| 6,044,394 A * | 3/2000 | Cadden et al. | 718/107 |
| 6,442,436 B1 * | 8/2002 | Nogami | 700/19 |
| 6,549,944 B1 * | 4/2003 | Weinberg et al. | 709/224 |
| 6,618,742 B1 | 9/2003 | Krum | |
| 7,096,248 B2 * | 8/2006 | Masters et al. | 709/201 |
| 2002/0194247 A1 | 12/2002 | Caggese et al. | |
| 2002/0198923 A1 | 12/2002 | Hayes, Jr. | |
| 2003/0236814 A1 * | 12/2003 | Miyasaka et al. | 709/102 |
| 2005/0022194 A1 * | 1/2005 | Weir et al. | 718/100 |

FOREIGN PATENT DOCUMENTS

| | | |
|---|---|---|
| JP | 2001-166928 | 6/2001 |
| JP | 2001-166928 A | 6/2001 |

OTHER PUBLICATIONS

Sybase, "Job Scheduler User's Guide", Document ID DC20001-01-1251-03.

* cited by examiner

*Primary Examiner*—Lewis A. Bullock, Jr.
(74) *Attorney, Agent, or Firm*—Antonelli, Terry, Stout & Kraus, LLP.

(57) ABSTRACT

To provide a suspending scenario generation method which is executed in a storage system including a management server provided with a storage device and a job scheduler for executing an operating scenario for managing the storage device, and generates the operating scenario and a suspending scenario for suspending execution of the operating scenario, the method including the steps of: obtaining a parameter input for a template for the operating scenario selected by a user; generating the operating scenario based on the parameter inputted for the operating scenario; after the parameter input for the operating scenario, obtaining a parameter input for generating a suspending scenario for suspending the operating scenario generated with the parameter; and generating the suspending scenario based on the parameter inputted for the suspending scenario.

11 Claims, 15 Drawing Sheets

OPERATING SCENARIO

SUSPENDING SCENARIO

| SCENARIO ID | JOB ID | JOB TYPE | NEXT JOB ID | |
|---|---|---|---|---|
| ScnBackup | BkJob1 | COMMAND | BkJob2 | OPERATING SCENARIO |
| ScnBackup | BkJob2 | COMMAND | BkJob3 | |
| ScnBackup | BkJob3 | COMMAND | - | |
| ... | ... | ... | ... | |
| ScnStop | EvtJob1 | EVENT RECEPTION | StopJob | SUSPENDING SCENARIO |
| ScnStop | EvtJob2 | EVENT RECEPTION | StopJob | |
| ScnStop | StopJob | COMMAND | MailJob | |
| ScnStop | MailJob | MAIL SENDING | - | |
| | | | | |

SCENARIO INFORMATION

FIG. 4A

| JOB ID | EVENT TYPE | OBJECT RESOURCE |
|---|---|---|
| EvtJob1 | SCHEDULED STOP | Instance1 |
| EvtJob2 | CHANGE IN RESOURCE | Instance1 |
| | | |

EVENT (RECEIVING) JOB ATTRIBUTE INFORMATION

FIG. 4B

| JOB ID | COMMAND | ARGUMENT 1 (SCENARIO ID) | ARGUMENT 2 (STOP JOB ID) | ARGUMENT 3 (FORCED TERMINATION FLAG) |
|---|---|---|---|---|
| StopJob | stop | ScnBackup | BkJob2 | off |
| | | | | |
| | | | | |

COMMAND JOB ATTRIBUTE INFORMATION

FIG. 4C

| JOB ID | ADDRESS | MESSAGE |
|---|---|---|
| MailJob | admin@***.jp | SUSPENDED |
| | | |

MAIL (SENDING) JOB ATTRIBUTE INFORMATION

OBJECT TO BACKUP  [Next]

Insantace1
Insantace2
⋮

FIG. 8B

RE-SYNCHRONIZE    Next
  ● YES
  ○ NO

} PARAMETER INPUT WIZARD SCREEN DETERMINED IN TEMPLATE

FIG. 8C

EXECUTION SUSPENSION SETTINGS

ADMINISTRATOR ADDRESS                      Next
admin@***.jp

OBJECT RESOURCE — 0810

| SQL INSTANCE | Insantace1 |
| SQL INSTANCE | Insantace2 |
| ⋮ | ⋮ |

JOB TO BE SUSPENDED — 0820

BkJob1
BkJob2
⋮

EVENT TRIGGERING SUSPENSION — 0830
☑ SCHEDULED STOP
☑ CHANGE IN RESOURCE STRUCTURE
☑ FAULT OCCURS

OTHER OPTIONS — 0840
☐ FORCED TERMINATION OF COMMAND BEING EXECUTED

| OPERATING SCENARIO ID | SUSPENDING SCENARIO ID |
|---|---|
| ScnBackup | ScnStop0 |
| ScnRestore1 | ScnStop1 |
| ScnRestore2 | ScnStop2 |
| ScnAddVol | ScnStop3 |
| ... | ... |

SUSPENDING SCENARIO CORRESPONDENCE INFORMATION

FIG. 10

| JOB ID | COMMAND | ARGUMENT 1 (SCENARIO ID) | ARGUMENT 2 (STOP JOB ID) | ARGUMENT 3 (FORCED TERMINATION FLAG) |
|---|---|---|---|---|
| SuspendJob | suspend | ScnBackup | - | - |
| InquiryJob | inquiry | ScnBackup | - | - |
| StopJob | stop | ScnBackup | BkJob2 | off |
| ResumeJob | resume | ScnBackup | - | - |

COMMAND JOB ATTRIBUTE INFORMATION

1310 — SuspendJob
1320 — InquiryJob
1340 — ResumeJob

FIG. 13

| EXECUTION SUSPENSION SETTINGS | | | |
|---|---|---|---|
| ADMINISTRATOR ADDRESS admin@***.jp | | | Next |
| OBJECT RESOURCE | | JOB TO BE SUSPENDED | |
| SQL INSTANCE | Insantace1 | BkJob1 | |
| SQL INSTANCE | Insantace2 | BkJob2 | |
| ... | ... | ... | |
| EVENT TRIGGERING SUSPENSION ☑ SCHEDULED STOP ☑ CHANGE IN RESOURCE STRUCTURE ☑ FAULT OCCURS | | OTHER OPTIONS ☐ FORCED TERMINATION OF COMMAND BEING EXECUTED ☐ QUERY ADMINISTRATOR BEFORE SUSPENDING — 1410 | |

SUSPENDING SCENARIO GENERATION METHOD, SERVER DEVICE, AND PROGRAM THEREFOR

CLAIM OF PRIORITY

The present application claims priority from Japanese application P2004-147482 filed on May 18, 2004, the content of which is hereby incorporated by reference into this application.

BACKGROUND

This invention relates to a method of using a job scheduler to automatically execute templated storage management applications, and more particularly to generation of a suspending scenario.

Applications using information processing devices include various templated applications. For example, in applications for managing storage that is a large-scale storage device, one templated application needs to periodically backup voluminous data. A job network is known as a technique which enables automatic execution of those templated applications and reduces processing load on an operator. A job network is a technique involving preparing a jobnet construct file where a job execution sequence has been determined in advance, and making one or a plurality of information processing devices execute each job automatically according to the jobnet construct file. Job execution sequences include the type of job to be executed, the time when the job should be executed, the destination to which results will be outputted, and links between the jobs themselves.

In order to execute the intended templated applications exactly, the jobnet construct file must be edited accurately and in minute detail (refer to JP 2001-166928 A).

SUMMARY

When using the above-mentioned jobnet construct file to execute a templated application, if the structure of the storage device changes, the jobnet construct file may perform an unforeseen operation and destroy data. When such a danger occurs, it is necessary to suspend the templated application executed by the jobnet construct file.

As such, it was necessary to detect execution errors and lapses in execution in the application executed by the jobnet construct file, and to notify an administrator of the detected errors and lapses in execution, so that the administrator would suspend the application. Furthermore, in order to automatically suspend the application being executed by the jobnet construct file, there was a need to create an execution suspension file corresponding to each jobnet construct file separately from the jobnet construct files.

According to an embodiment of this invention, a suspending scenario generation method which is executed in a storage system comprising a management server provided with a storage device and a job scheduler for executing an operating scenario for managing the storage device, and generates the operating scenario and a suspending scenario for suspending execution of the operating scenario, the method including the steps of: obtaining a parameter input for a template for the operating scenario selected by a user; generating the operating scenario based on the parameter inputted for the operating scenario; after the parameter input for the operating scenario, obtaining a parameter input for generating a suspending scenario for suspending the operating scenario generated with the parameter; and generating the suspending scenario based on the parameter inputted for the suspending scenario.

BRIEF DESCRIPTION OF THE DRAWINGS

This invention can be appreciated by the description, which follows in conjunction with the following figures, wherein:

FIGS. 4A to 4D are explanatory diagrams of scenario files according to the first embodiment;

FIGS. 8A to 8C are explanatory diagrams of screens displayed by the scenario executing file setting processing according to the first embodiment;

FIG. 10 is an explanatory diagram of suspending scenario correspondence information according to the first embodiment;

FIG. 13 is an explanatory diagram of a scenario file according to the third embodiment;

FIG. 14 is an explanatory diagram of a screen displayed by scenario executing file setting processing according to the third embodiment.

DETAILED DESCRIPTION OF THE PREFERRED EMBODIMENTS

Hereinafter, explanation is given regarding embodiments of this invention with reference to the drawings.

Figure 1:
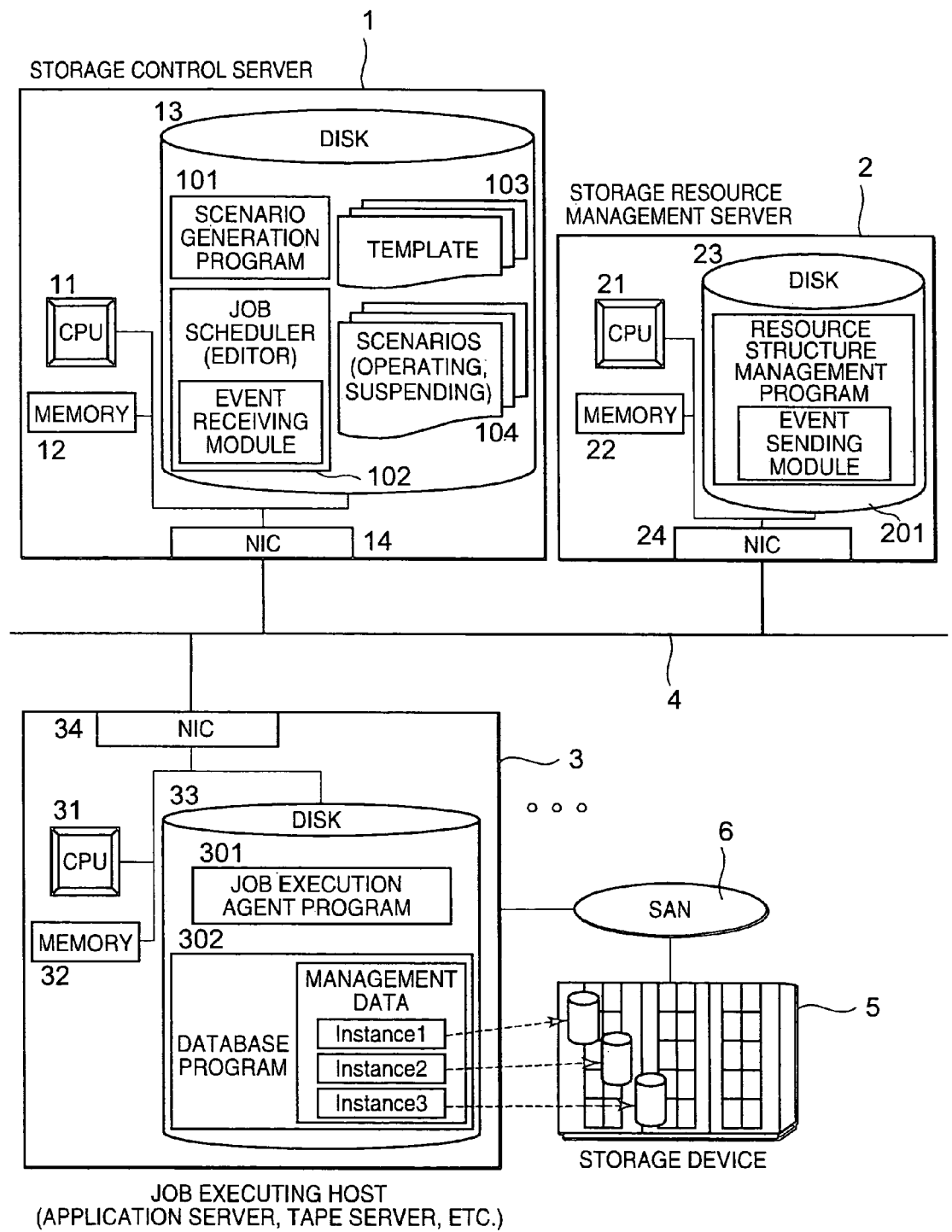
FIG. 1 is a block diagram of a storage system according to a first embodiment of this invention.

FIG. 1 is a block diagram of a construction of a storage system according to a first embodiment of this invention.

The storage system according to the first embodiment is constituted by a storage control server 1, a storage resource management server 2, a job executing host 3, a storage device 5, and networks 4 and 6 connecting these.

The storage control server 1 is a computer device having a CPU 11, a memory 12, a disk drive 13, a network interface (NIC) 14, an input device and a display device, and executes templated applications (e.g., periodically backing up of data stored in the storage device 5). In the storage control server 1, the CPU 11 executes a scenario editor 101 stored on the disk 13 to edit an operating scenario file (jobnet construct files) and a suspending scenario file (jobnet construct files) and register these generated scenarios 104 into a job scheduler.

A template 103 is used to generate the scenario. The template 103 is a file in which an execution sequence of the operating scenario is written. The scenario editor 101 writes inputted parameters into the template to create the scenario.

Further, the CPU 11 executes the job scheduler 102 stored on the disk 13, whereby jobs are executed according to the scenario at a predetermined timing (at predetermined times, or when a predetermined event occurs).

The job scheduler 102 is provided with an event receiving module. The event receiving module receives an event that is sent by a resource structure management program 201 of the storage resource management server 2. Further, the job scheduler 102 is provided with an editor, and the editor is able to edit the scenario file.

The disk 13 stores the template 103 used to generate the scenario and the generated scenarios (operating scenario and suspending scenario) 104.

The storage resource management server 2 is a computer device that is provided with a CPU 21, a memory 22, a disk drive 23, a network interface (NIC) 24, an input device and a display device. In the storage resource management server 2, the CPU 21 executes the resource structure management program 201 stored on the disk 23, thus constituting an event sending module, which sends the event to the storage control server 1 when the resources of the storage is changed. Here, "resource structure" includes structure of apparatuses such as storage devices, SANs, switches, hosts, networks and the like. Furthermore "resource structure" includes structure of software such as databases for managing application data, setting information about data backup, and the like.

The job executing host 3 is a computer device provided with a CPU 31, a memory 32, a disk drive 33, a network interface (NIC) 34, an input device and a display device, and functions as an application server and a tape backup server.

In the job executing host 3, the CPU 31 executes a job execution agent program 301 stored on the disk 33, whereby commands corresponding to received jobs are executed. For example, in a case where a database program 302 is arranged in the job executing host 3 and is operated as a database server, when a job of a backup command of the database program 302 is received from the storage control server 1, the data (Instance1, etc.) stored on the storage device 5 is backed up onto a tape.

The storage control server 1, the storage resource management server 2, and the job executing host 3 are connected via a LAN 4. The LAN 4 can communicate data and control information among computers, for example, by means of TCP/IP protocol. For example, Ethernet is used for the LAN 4.

The storage device 5 is constituted including a plurality of disks and a disk array controller. A control program operates on the disk array controller to control input/output of data to/from the disk based on requests from another computer device (not shown). Further, the structure of a Redundant Array of Independent Disks (RAID) constituted by the disks is also managed by the control program.

The storage device 5 is connected to the job executing host 3 via a SAN 6.

The SAN 6 is a network capable of communicating by means of a protocol that is suited for transferring of data, for example, Fiber Channel protocol.

Figure 2A:
FIGS. 2A and 2B are explanatory diagrams of scenarios according to the first embodiment.
Figure 2B:
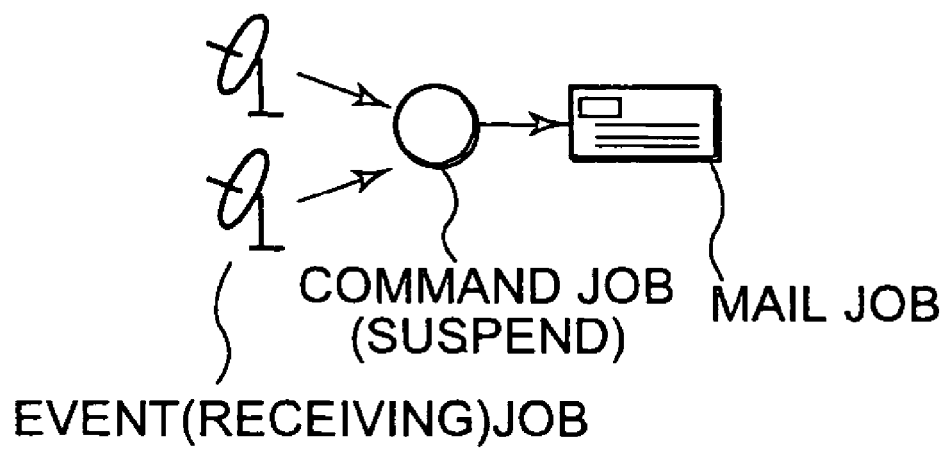
Figure 3:
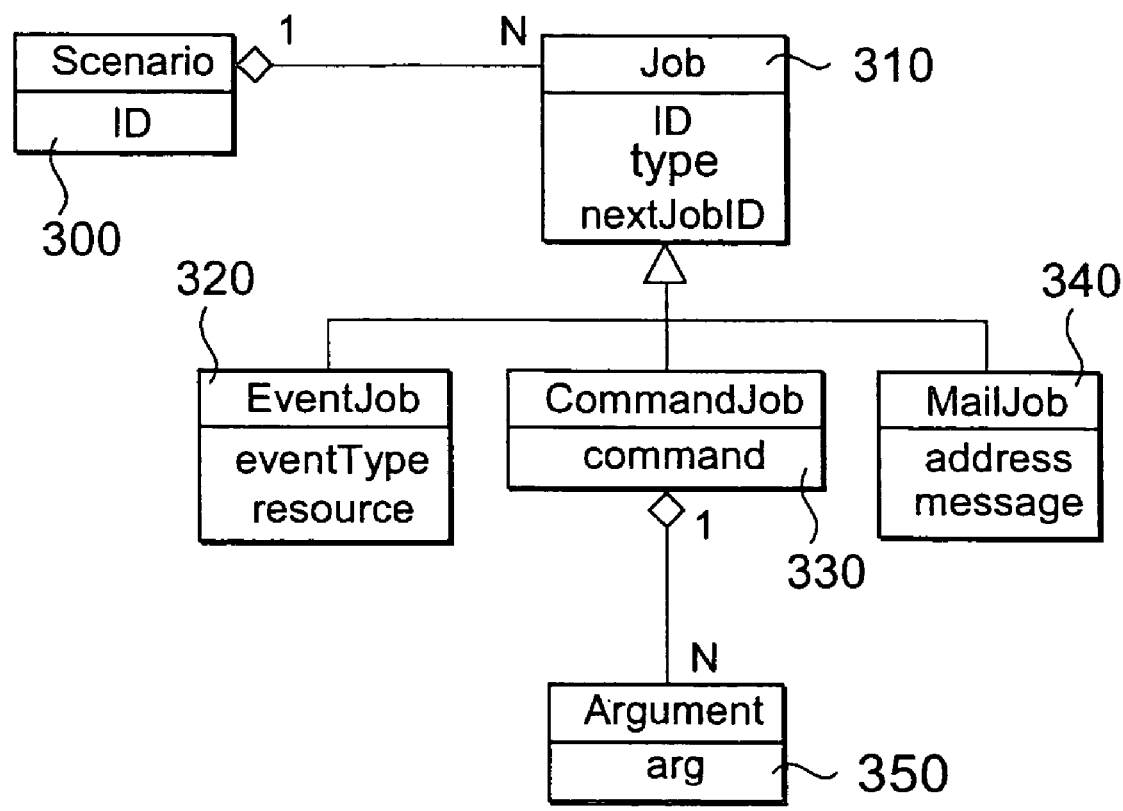
FIG. 3 is an explanatory diagram of a structure of the scenario according to the first embodiment.

FIG. 2 and FIG. 3 are explanatory diagrams of scenarios according to the first embodiment.

The scenarios include an operating scenario and a suspending scenario. FIG. 2A shows the operating scenario, and FIG. 2B shows the suspending scenario.

In the operating scenario (FIG. 2A), a plurality of jobs are continuously executed. In the suspending scenario (FIG. 2B), when a specific event occurs, a command job to suspend the operating scenario is executed. Further, a mail job is executed to notify an administrator about the occurrence of the event (the job result may also be included).

FIG. 3 shows a structure of a scenario. A scenario 300 is assigned an identifire (a scenario ID) for identifying the scenario. Normally, a single scenario includes a plurality of jobs. Each job 310 includes an identification number for identifying the job (a job ID), a type of job (type), and an identification number of the job to be executed next (a next Job ID).

The jobs included in the suspending scenario include a plurality of types of jobs (an event (receiving) job 320, a command job 330, and a mail (sending) job 340). The event (receiving) job 320 includes an event type specifying the type of event received, and information about the resource to be received by the event (receiving) job. The command job 330 issues a command and makes the job executing host 3 perform predetermined operations. The command job 330 contains a plurality of arguments 350. These arguments specify the resource that will be an object of the command, and options when the command is executed. The mail (sending) job 340 is a job that sends an electronic mail to notify the administrator, and includes a destination address and the message to be sent. Further, the operating scenario also includes at least one or a plurality of command jobs 330 of the plurality of types of jobs shown in FIG. 3.

FIG. 4 is an explanatory diagram of a scenario file 104 constituting the scenario according to the first embodiment.

The scenario file 104 is constituted by a scenario information table (FIG. 4A) that specifies the scenario, an event (receiving) job attribute information table (FIG. 4B) that specifies the event (receiving) job included in the scenario, a command job attribute information table (FIG. 4C) that specifies the command job included in the scenario, and a mail (sending) job attribute information table (FIG. 4D) that specifies the mail (sending) job included in the scenario.

The scenario information is information constituting the scenario, and is constituted of fields of the scenario ID, the job ID, the job type and the next job ID (FIG. 4A).

The scenario ID is information for identifying the scenario, and the job of the same scenario ID constitutes a single scenario. For example, a scenario "ScnBackup" includes three jobs of "BkJob1", "BkJob2", and "BkJob3".

The job ID is information for identifying the job to be executed in the scenario. The job type indicates the type of the given job. The job type includes the event (receiving) job, the command job, and the mail (sending) job. The job content is each specified by the event (receiving) job attribute information table (FIG. 4B), the command job attribute information table (FIG. 4C), and the mail (sending) job attribute information table (FIG. 4D). In the field of the next job ID, the ID of the job to be executed after the current job in the scenario is registered.

FIG. 4B is the event (receiving) job attribute information table, which specifies the content of the event (receiving) job, being constituted by fields of the job ID, the event type, and the object resource.

The job ID is information for identifying the job, and corresponds to the job ID specified in the scenario information. The event type shows the type of the event to be received by the job. The object resource shows the resource that is the source of the event received by the job. That is, when the event specified in the event type is received from the resource specified in the object resource, the job specified in the next job ID in the scenario information is executed (i.e., the scenario is executed).

FIG. 4C is the command job attribute information table that specifies the content of the command job, being constituted by fields of the job ID, the command, and the plurality of arguments.

The job ID is information for identifying the job, and corresponds to the job ID specified in the scenario information. The command shows a command to be executed by the job.

A plurality of the arguments are provided. In a "stop" command, an argument 1 is a scenario ID of a scenario including a job that is stopped by the current job. An argument 2 is a job ID of a job that is stopped by the current job. An argument 3 is a forced termination flag. In the example shown in FIG. 4, "BkJob2" is specified in the argument 2 (stop job ID). Therefore, if the execution of "ScnBackup" is at or beyond "BkJob2", then the execution is suspended by "StopJob". It should be noted that the argument 3 (forced termination flag) is "off", so the scenario execution is suspended until the command ends, without forcibly terminating the command process being currently executed. It should be noted that depending on the type of command, different arguments with different meanings and quantities are defined.

FIG. 4D is a mail (sending) job attribute information table which specifies the content of the mail (sending) job, being constituted by fields of the job ID, a notification destination address, and a notification message.

The job ID is information for identifying the job, and corresponds to the job ID specified in the scenario information. In the field of the notification destination address, an address serving as the destination of the electronic mail is specified. In the field of the notification message, the content to be notified by the electronic mail is specified.

It should be noted that the mail (sending) job uses the electronic mail to notify the administrator of the occurrence of events and of the suspension of operating scenarios, but methods other than electronic mail (e.g., Messenger) may be used to notify the administrator.

Figure 5:
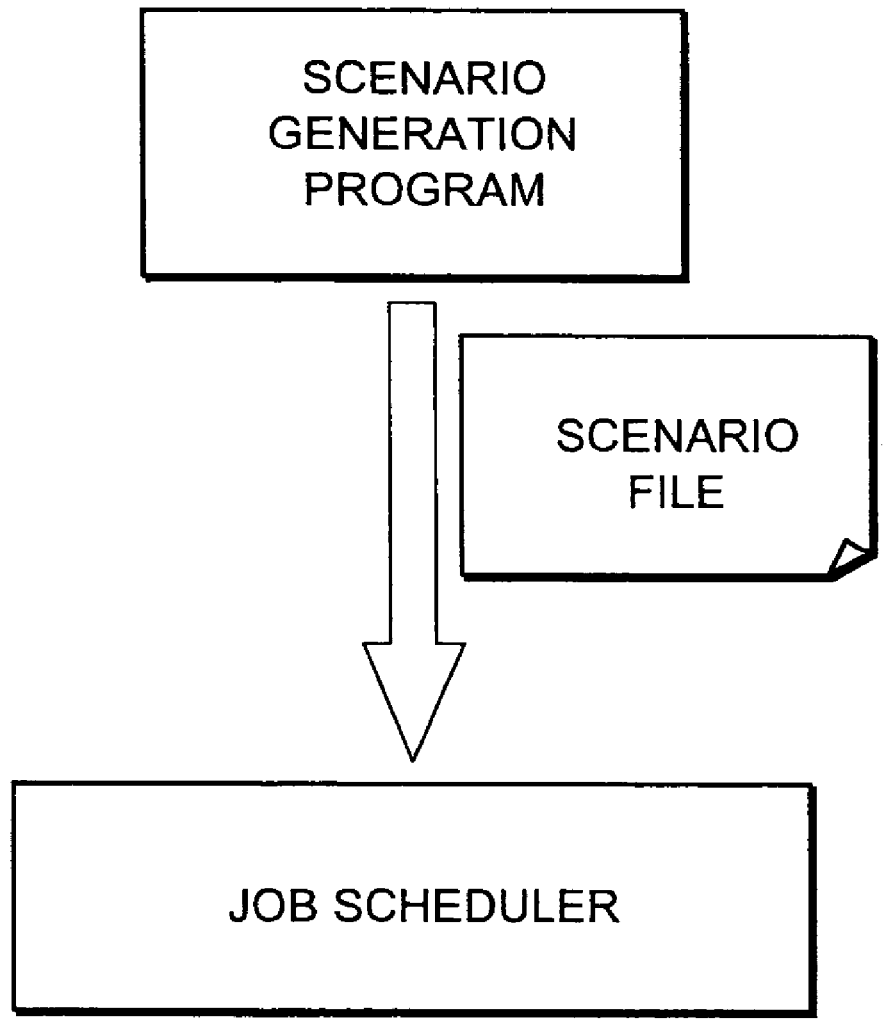
FIG. 5 is a conceptual diagram of scenario generation processing according to the first embodiment.

FIG. 5 is a conceptual diagram of scenario generation processing according to the first embodiment.

A wizard obtains a parameter input from a user, and outputs the scenario file with the inputted parameter input embedded therein, to the job scheduler. The job scheduler registers the received scenario file, so that the job is executed according to the operation scenario at a predetermined timing (predetermined time, or when a predetermined event occurs).

Figure 6:
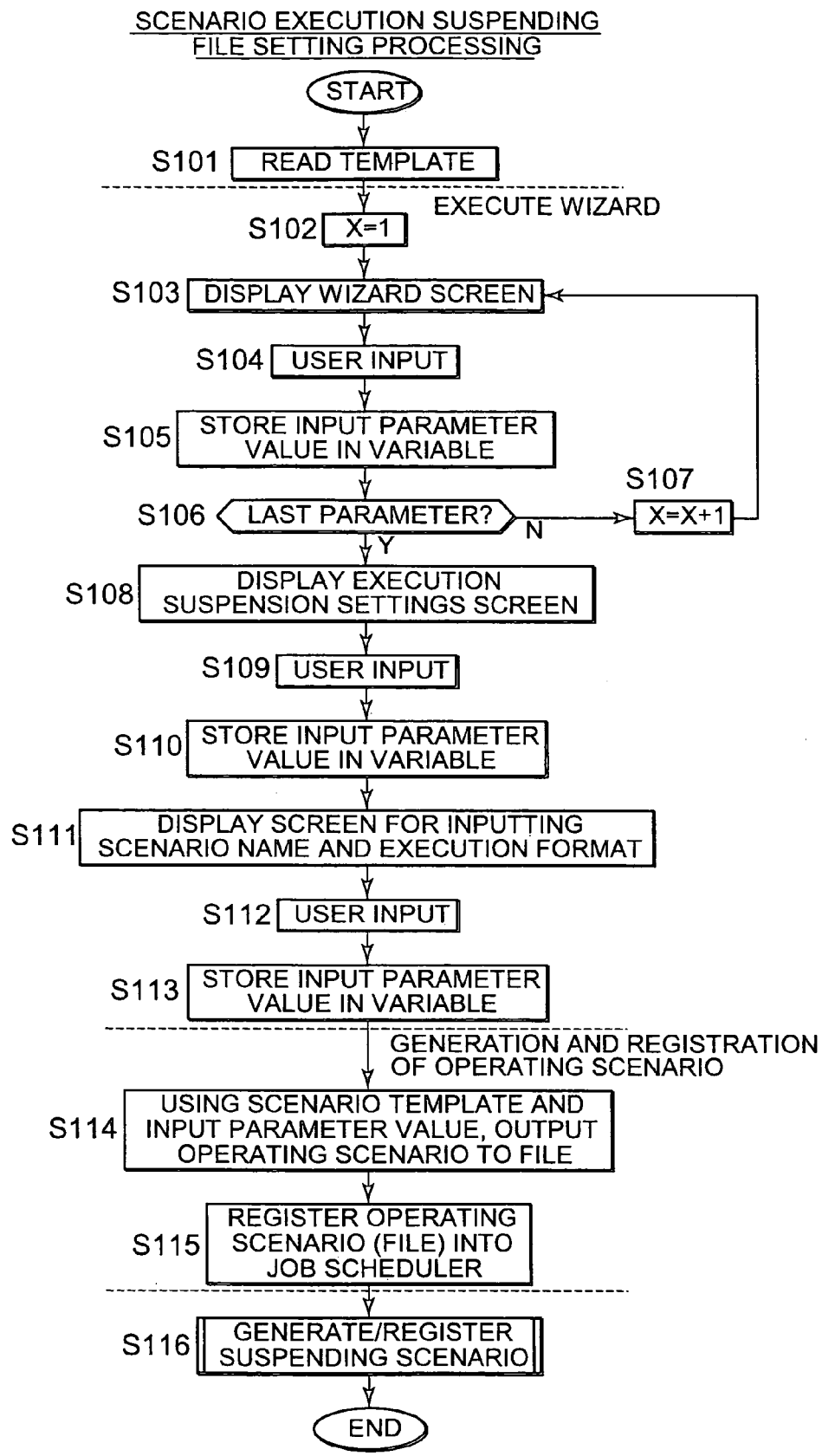
FIG. 6 is a flowchart of scenario executing file setting processing according to the first embodiment.

FIG. 6 is a flowchart of processing for setting the scenario executing file, according to the first embodiment.

Specifically, a template for setting the scenario executing file is read from the disk 13 (S101). Then, the template that was read is displayed, and the administrator is urged to select the template.

After that, when the template has been selected by the administrator, the wizard for setting the scenario executing file and the suspending scenario file is executed.

First, the wizard initializes, to "1", the setting in a counter that manages the parameter inputted by the user (S102).

Then, a wizard screen is displayed (S103), and the first parameter input by the user is requested (S104). Then, the parameter inputted by the user is stored as a variable (S105).

After that, the processing determines whether or not the last parameter is inputted (S106). If the last parameter has not yet been inputted, then "1" is added to update the counter X "1" (S107), and the processing returns to step S103, and the next parameter input is requested. On the other hand, if the last parameter has been inputted, then the parameter inputs are determined to be complete, and the settings screen (FIG. 8C) for the suspending scenario file is displayed (S108).

Then, input by the user is requested for the entries displayed on the screen (the object resource, the event type, forced termination, etc.) (S109). Then, the parameters inputted by the user are stored as variables (S110).

After that, the scenario name and an execution format input screen are displayed (S111). Input by the user is requested for the entries displayed on this screen (S112). Then, the parameters inputted by the user are stored as variables (S113).

Next, the operating scenario generation/registration processing is executed. First, the operating scenario is generated based on the scenario template and the input parameter value, and the file is outputted (S114). At this time, the input parameter value is registered in the command job attribute information (FIG. 4C) as arguments for the command. Then, the operating scenario file is registered in the job scheduler 102, so that the job is executed according to the operating scenario at a predetermined timing (predetermined time) (S115).

After that, the suspending scenario generation/registration processing is executed (S116).

Figure 7:
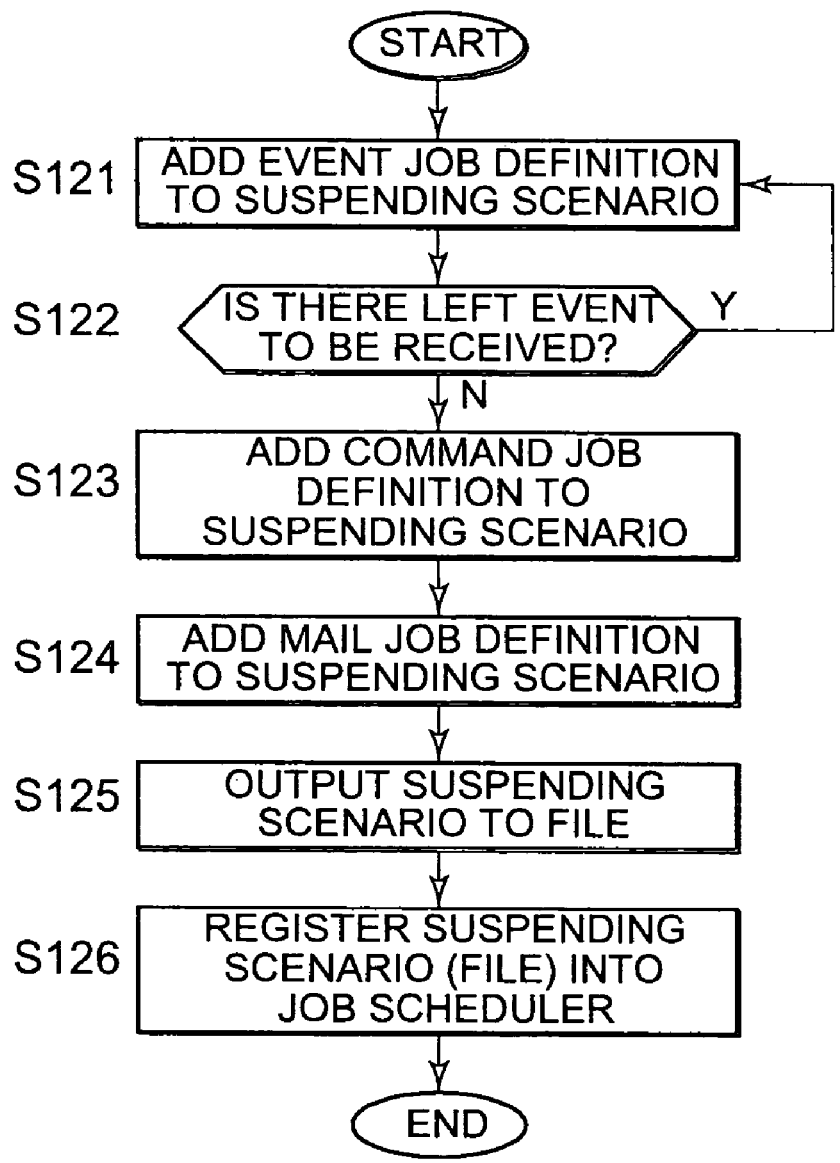
FIG. 7 is a flowchart of suspending scenario generation processing according to the first embodiment.

FIG. 7 is a flowchart of the suspension scenario generation/registration processing according to the first embodiment. This processing is called from step S116 in the scenario executing file setting processing (FIG. 6).

First, a definition of the event job is added to the suspending scenario (S121). At this time, the parameters (arguments) of this job are inputted with the wizard (S109, S112 of the scenario executing file setting processing (FIG. 6)).

Then, the processing determines whether or not there are left events to be received (S122). As the result, when there is an event to be received, the processing returns to step S121 to add the definition of the event job to the suspension scenario. On the other hand, when there are no more jobs to be received, the definition of the command job is added to the suspending scenario, and to determine the operating scenario to be suspended, and which job of which resource of the operating scenario to suspend (S123). Then, the mail job is added to the suspending scenario, and the processing determines what type of message to send to whom (S124).

After that, the suspending scenario is generated and the file is outputted (S125). Then, the suspending scenario file is registered in the job scheduler, so that the job is executed according to the suspending scenario at the predetermined time (e.g., when a predetermined event occurs) (S126).

FIGS. 8A to 8C are explanatory diagrams of the settings screen displayed by the wizard in the scenario executing file setting processing according to the first embodiment.

FIG. 8A and FIG. 8B show screens for selecting the parameters when executing the command job to create the scenario executing file. In the example shown in FIG. 8A, as the resource to be backed up, it is possible to select an SQL instance (a database management unit by which database can be booted and stopped). FIG. 8B is a screen for selecting whether to re-synchronize. It should be noted that the parameter input wizard screen is not restricted to the two screens shown in FIG. 8A and FIG. 8B, but may also be constituted by two or more screens.

FIG. 8C shows a settings screen for suspending execution. An upper portion of the screen is provided with a field for inputting an administrator address to serve as a sending destination for notifying about the execution of the suspending scenario.

Furthermore, there is also provided a selection field 0810 for selecting the resource to be the suspended object. Displayed in the object resource field 0810 is a resource relating to the operating scenario that was just generated, to thereby facilitate designation of the resource to be suspended. The selection field 0820 for selecting the job to be suspended shows a job list of operating scenarios to be suspended. Designations are given to wait for a particular job to be executed and before suspending scenario execution. For example, in FIG. 8C, when "BkJob2" is designated, if "BkJob1" is being executed, the operating scenario is not suspended. Rather, when "BkJob2" processing is complete, the scenario execution is suspended. If "BkJob2" processing is complete and subsequent jobs are being executed, then the execution of the scenario is immediately suspended.

A lower portion of the object resource selection field 0810 is provided with a check box 0830 for selecting an event type to trigger job suspension. Furthermore, in a lower portion of the selection field 0820 for selecting the job to be suspended, there is provided a scenario execution suspension file option 0840, which is a check box for selecting whether to effect forced termination of the command processes currently being executed (the command included in the scenario), or whether to wait for the process to end before suspending the scenario execution. When this check box is checked, the command process currently being executed is forced to terminate.

On the other hand, when there is no job designation in the selection field 0820 for selecting the job to be suspended and the check box is checked in the option 0840 to select forced termination, the job currently being executed is suspended immediately when the even occurs.

Figure 9:
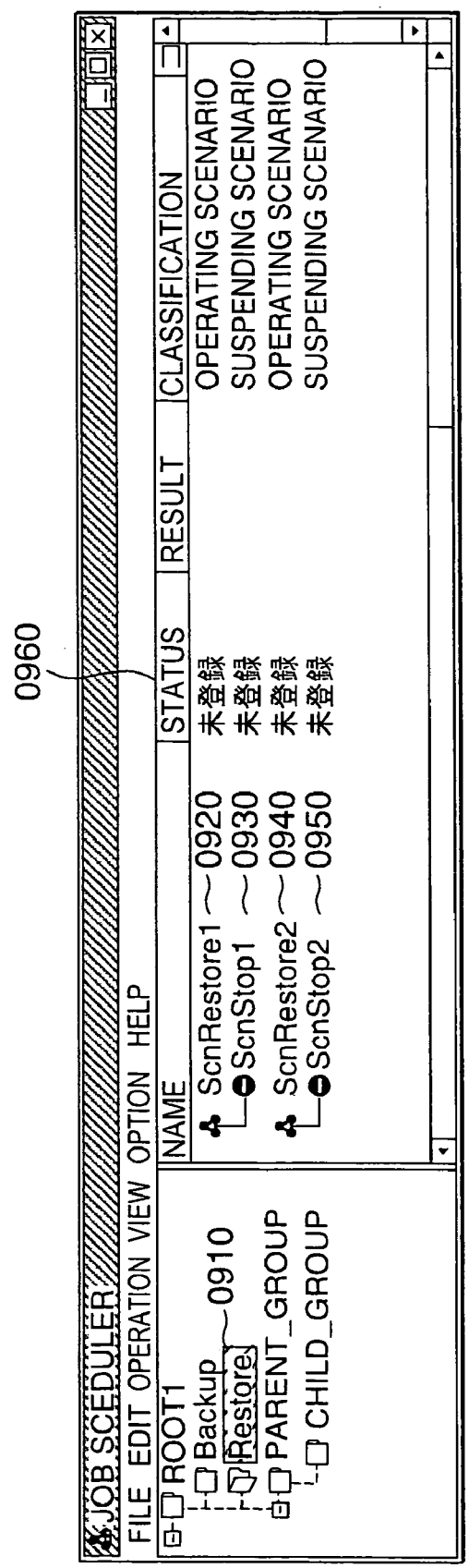
FIG. 9 is an explanatory diagram of a scenario management screen according to the first embodiment.

FIG. 9 is an explanatory diagram of a scenario management screen according to the first embodiment.

The management screen shown in FIG. 9 displays the operating scenarios and the suspending scenarios registered in the job scheduler. The left field in the screen displays a tree structure of a directory in the job scheduler. The right field displays the scenario files registered in the directory 0910 ("Restore" in FIG. 9) selected in the left field.

That is, for an operating scenario "ScnRestore1" 0920 there is registered a suspending scenario "ScnStop1" 0930, and for an operating scenario "ScnRestore2" 0940 there is registered a suspending scenario "ScnStop2" 0950.

Furthermore, in this management screen there is registered the status of each scenario file 104. This status field shows whether each scenario file has been registered for scheduling. Referring to the status shown in FIG. 9, the status of each scenario file is "unused", which indicates that each scenario file has not been registered for scheduling.

FIG. 10 is an explanatory diagram of the suspending scenario correspondence information 1030 according to the first embodiment.

In the suspending scenario correspondence information 1030, corresponding to the operating scenario ID 1010, there is registered an ID 1020 of the suspending scenario of the operating scenario concerned. The operating scenario and the suspending scenario are managed in association with each other.

Given above is explanation of the storage system according to the first embodiment of this invention, but this invention is not limited to a storage system and may be applied in a computer system where jobs are executed according to the operating scenario, or in other management systems and the like.

Figure 11:
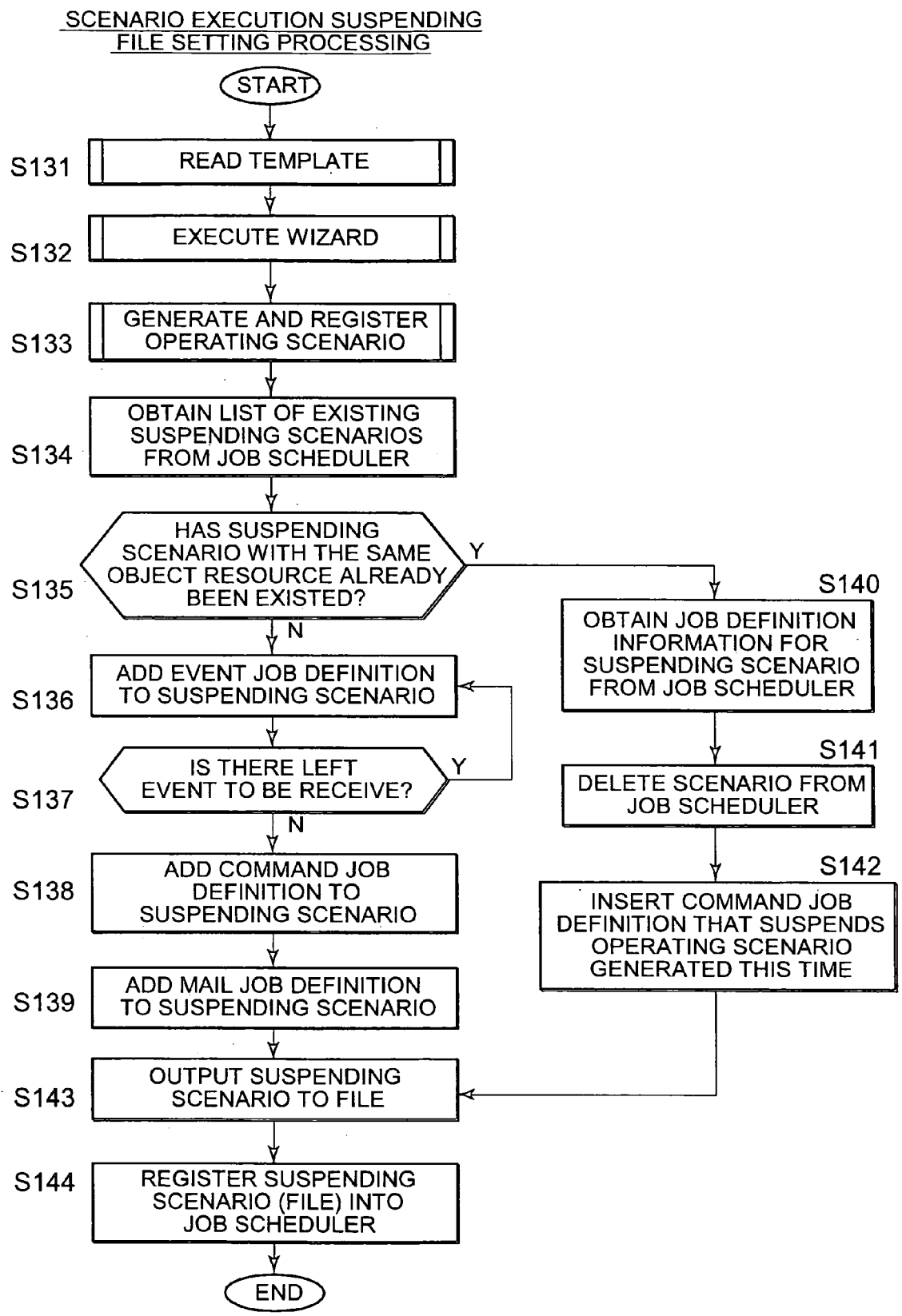
FIG. 11 is a flowchart of scenario executing file setting processing according to a second embodiment.

FIG. 11 is a flowchart showing setting processing for a scenario executing file according to a second embodiment of this invention. The scenario executing file setting processing according to the second embodiment differs from the processing in the first embodiment in that the suspending scenario file is set on the basis of the resource.

First, the CPU 11 reads the template (S131), executes the wizard (S132), and performs generation and registration of the operating scenario (S133). This template reading processing (S131) is the same as the processing at S101 of the scenario executing file setting processing (FIG. 6) according to the first embodiment. Furthermore, the execution of the wizard (S132) is the same as the processing at S102 to S113 in FIG. 6. Furthermore, the generation and registration of the operating scenario (S133) are the same as the processing at S104 to S115 in FIG. 6.

After that, in the scenario executing file setting processing according to the second embodiment, the CPU 11 obtains a list of the existing suspending scenarios from the job scheduler 102 (S134). It should be noted that it is also possible to reference the scenario file 104 to obtain the list of the existing suspending scenarios. Then, it is determined whether or not there already exists a suspending scenario for the same resource (S135).

When the result is that there is no suspending scenario for the same resource, first the definition of the event job is added to the suspending scenario, and the event to be received is determined (S136). After that, the processing determines whether there is left an event to be received (S137). When the result is that there is let an event to be received, the processing returns to step S136, and then the definition of the event job is added to the suspending scenario. On the other hand, if there is no more event to be received, then the command job is added to determine which scenario to suspend with the suspending scenario (S138). Then the mail job is added to determine what kind of message to send to whom (S139). After that, the processing advances to step S143. The processing at step S136 through step S139 is the same as the processing at step S121 through S124 of the suspending scenario generation/registration processing (FIG. 7) according to the first embodiment.

On the other hand, if a suspending scenario for suspending the same resource does exist, then job definition information of the suspending scenario is obtained from the job scheduler 102 (S140), the scenario concerned is deleted from the job scheduler 102 (S141), and the command job definition for suspending the operating scenario to be generated this time is inputted (S142). After that, the processing goes to step S143.

At step S143, the generated suspending scenario is outputted to the file (S143). Then, the suspending scenario file is registered in the job scheduler 102, so that the job is executed according to the suspending scenario at the predetermined timing (when the predetermined event occurs) (S144).

Figure 12:
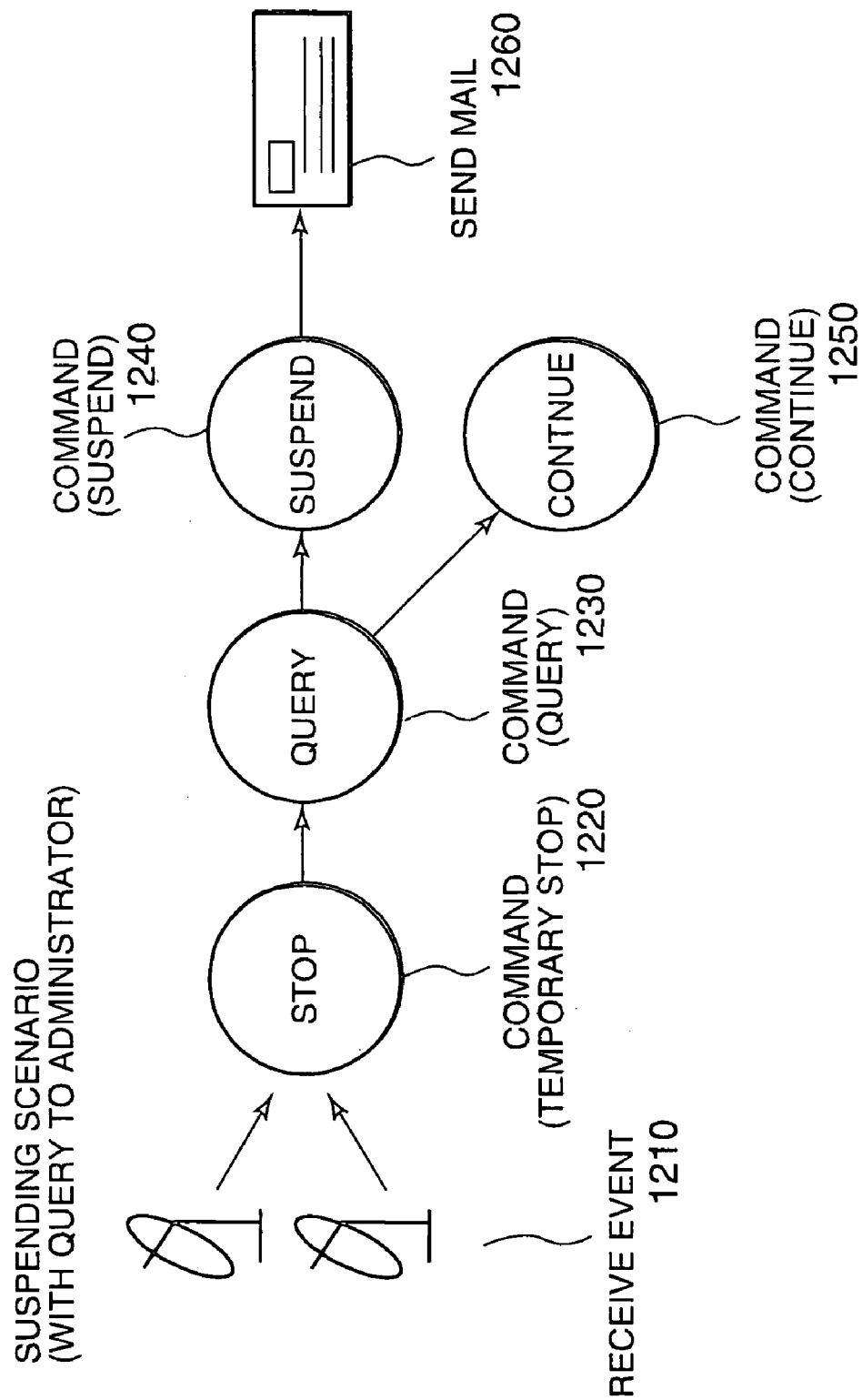
FIG. 12 is an explanatory diagram of a scenario according to a third embodiment.

FIG. 12 is an explanatory diagram of a suspending scenario according to a third embodiment of this invention. In the third embodiment, in addition to the jobs in the first embodiment as mentioned above, a job 1230 is added which, in accordance with an instruction from the user, temporarily stops the operating scenario and queries the administrator as to whether to suspend or to continue it.

When a specific event occurs and is received (1210), a command job 1220 for temporarily stopping the operating scenario is executed. Then, for example, a dialogue is displayed to execute the command job 1230 that queries the administrator as to whether to suspend execution of the operating scenario when the event occurs, or to continue with the scenario execution. As a result, when the administrator gives an instruction to suspend the scenario execution, a job command 1240 for suspending the operating scenario is executed. Furthermore, the mail job is executed and the suspension of the execution of the operating scenario is notified to the administrator (1260). On the other hand, when the administrator gives the instruction to continue with the execution of the scenario, a command job 1250 for continuing the operating scenario is executed.

FIG. 13 is an explanatory diagram of a command job attribute information table, which constitutes the scenario file 104 constituting the scenario of the third embodiment.

The construction of the table is similar to that of the first embodiment, which is described above. In the case of the third embodiment, for example, a "SuspendJob" 1310 command job for temporarily stopping the operating scenario, an "InquiryJob" 1320 command job for querying to the administrator, and a "ResumeJob" 1340 command job for continuing the execution of the operating scenario, are added to the record.

FIG. 14 shows a settings screen for the suspension of execution, which is displayed by the wizard, in the scenario executing file setting processing according to the third embodiment.

In a lower-right portion of the screen shown in FIG. 8C of the first embodiment, as an option in the scenario executing file, there is provided a check box 1410 for selecting whether to suspend the execution of the scenario after the query to the administrator, or to suspend the operating scenario that is currently being executed without querying the administrator.

Figure 15:
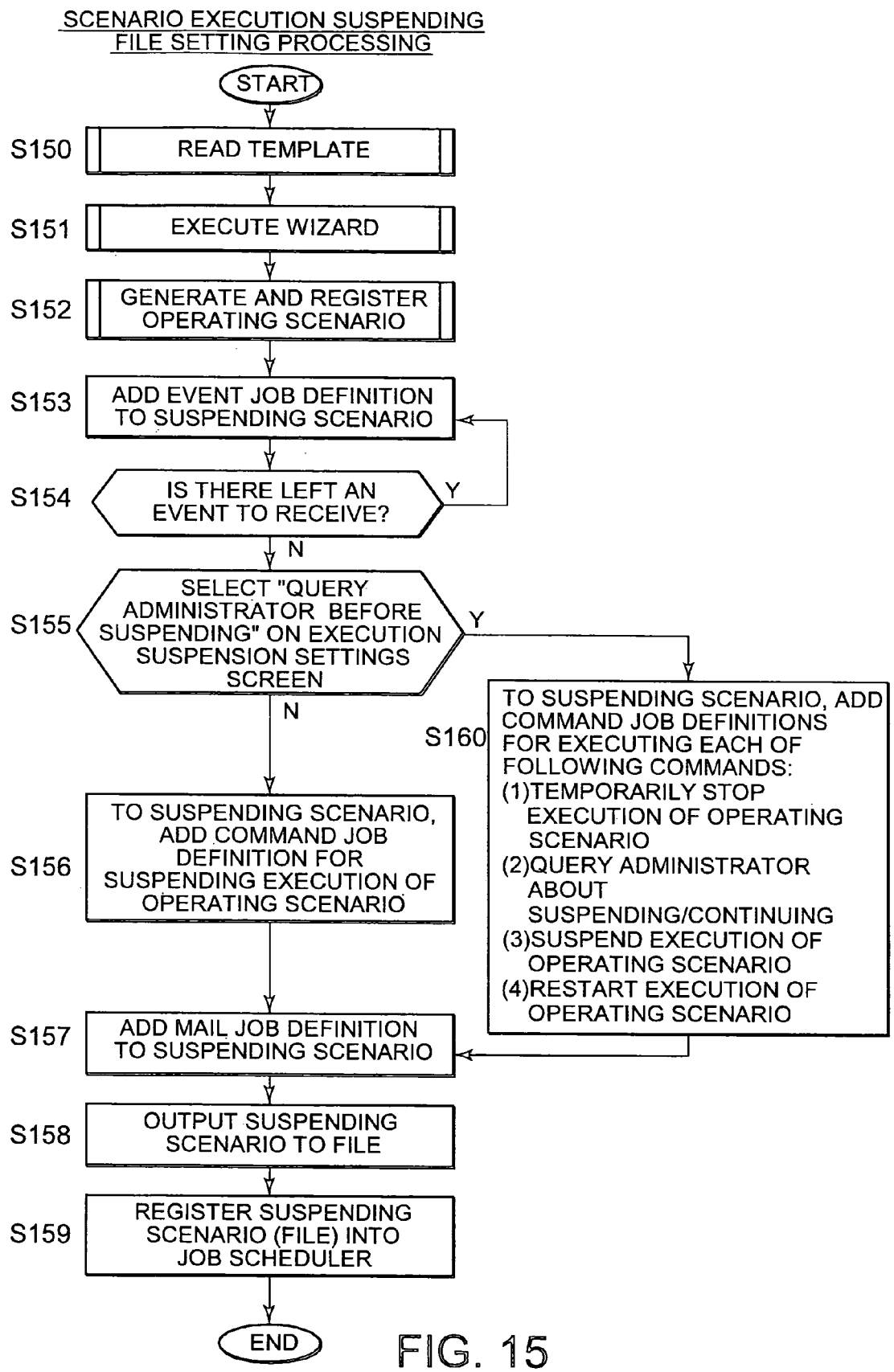
FIG. 15 is a flowchart of the scenario executing file setting processing according to the third embodiment.

FIG. 15 is a flowchart of processing for setting the scenario executing file, according to the third embodiment. In the third embodiment, in addition to the processing of the first embodiment, a command job is defined, which, in accordance with an instruction from the user, temporarily stops the operating scenario and queries the administrator about whether to suspend or to continue it.

First, the CPU 11 reads the template (S150), executes the wizard (S151), and generates and registers the operating scenario (S152). The template reading processing (S150) is the same as the processing at S101 in the scenario executing file setting processing (FIG. 6) according to the first embodiment described above. Furthermore, the execution of the wizard (S151) is the same as the processing at S102 through S113 in FIG. 6. Furthermore, the generation and registration of the operating scenario (S152) is the same as the processing at S114 and S115 in FIG. 6.

Next, the definition of the event job is added to the suspending scenario (S153), and the processing determines whether or not there is still an event to be received (S154). If the result is that there is still an event to be received, then the processing returns to step S153, and the event job definition is added to the suspending scenario. The processing at steps S153 and S154 is the same as the processing at S121 and S122 in the suspending scenario generation/registration processing (FIG. 7) according to the first embodiment described above.

After that, in the scenario executing file setting processing according to the third embodiment, while the wizard is being executed, in the option designations on the execution suspending settings screen, it is determined whether or not the check box 1410 for "querying administrator before suspending" has been checked by the user (S155).

If the check box 1410 has not been checked by the user, then the definition of the command job to suspend the execution of the operating scenario is added to the suspending scenario (S156). After that, the processing advances to step S157. On the other hand, if the check box 1410 has been checked, then the following definitions are each added to the suspending scenario: a command job for temporarily stopping the execution of the operating scenario, a command job for querying the administrator as to whether to suspend or continue it, a command job for suspending the execution of the operating scenario, and a command job for restarting the execution of the operating scenario (S160). After that, the processing advances to step S157.

At step S157, the mail job is added, and an input about what type of message to send to whom, is received. The foregoing processing completes the definition of the suspending scenario with the query or without the query. At step S158, the generated suspending scenario is outputted to the file. Then, the suspending scenario file is registered in the job scheduler 102, so that the job is executed according to the suspending scenario at predetermined timing (when the predetermined event occurs) (S159). The processing at steps S157 through S159 is the same as the processing at S124 through S126 in the suspending scenario generation/registration processing (FIG. 7) in the first embodiment described above.

According to the above-specified embodiment, the suspending scenario is created when the operating scenario is generated. Therefore, if a resource in the storage system changes, the execution of the operating scenario can be suspended automatically, so that destruction of data due to execution of the operating scenario while the storage system resource is in the altered state can be prepared.

While the present invention has been described in detail and pictorially in the accompanying drawings, the present invention is not limited to such detail but covers various obvious modifications and equivalent arrangements, which fall within the purview of the appended claims.

What is claimed is:

1. A suspending scenario generation method which is executed in a storage system comprising a management server provided with a storage device and a job scheduler for executing an operating scenario for managing the storage device, the method comprising:

a first step of reading a template for generating an operating scenario;

a second step of executing a wizard for obtaining input of a parameter for generating the operating scenario based on the template that was read;

a third step of registering the operating scenario generated based on the inputted parameter into the job scheduler so as to be executed at a predetermined date and time;

a fourth step of determining an event to trigger suspending the generated operating scenario, and adding an event job into a suspending scenario;

a fifth step of determining which job for which resource to suspend, and adding a command job into the suspending scenario;

a sixth step of determining what kind of message to notify to whom, and adding a mail job into the suspending scenario; and a seventh step of registering the suspending scenario into the job scheduler so that the suspending scenario is executed at the time when the event occurs.

2. The suspending scenario generation method according to claim 1, further comprising:

an eighth step of determining whether there is a suspending scenario whose object is the storage device relating to executing the generated operating scenario;

a ninth step of obtaining, from the job scheduler, information about the suspending scenario whose object is the storage device;

a tenth step of deleting the suspending scenario from the job scheduler, and an eleventh step of adding a command job for suspending the generated operating scenario, into the obtained suspending scenario, wherein:

as the result of determining in the eighth step, when there is no suspending scenario whose object is the storage device relating to executing the generated operating scenario, the fourth to the sixth steps are executed; and as the result of determining in the eighth step, when there is a suspending scenario whose object is the storage device relating to executing the generated operating scenario, the ninth to the eleventh steps are executed.

3. A suspending scenario generation method which is executed in a storage system comprising a management server provided with a storage device and a job scheduler for executing an operating scenario for managing the storage device, the method comprising the steps of a first step of obtaining a parameter input for a template for the operating scenario selected by a user;

a second step of generating the operating scenario based on the parameter inputted for the operating scenario;

after the parameter input for the operating scenario, a third step of obtaining a parameter input for generating a suspending scenario for suspending the operating scenario generated with the parameter;

a fourth step of generating the suspending scenario based on the parameter inputted for the suspending scenario and a fifth step of determining an event to trigger suspending the generated operating scenario, and adding an event job into the suspending scenario;

a sixth step of determining which job for which resource to suspend, and adding a command job into the suspending scenario;

a seventh step of determining what type of message to notify and to whom, and adding a mail job to the suspending scenario:

an eighth step of selecting, as a parameter for generating the suspending scenario, one of temporarily stopping execution of the operating scenario and then suspending the operating scenario after an instruction by a user, and suspending the operating scenario without querying the user;

a ninth step of determining an event to trigger suspending the generated operating scenario, and adding an event job to the suspending scenario;

a tenth step of adding to the suspending scenario a command job for temporarily stopping execution of the operating scenario;

an eleventh step of adding to the suspending scenario a command job for querying the user as to whether to suspend or continue the operating scenario;

a twelfth step of adding to the suspending scenario a command job for suspending the operating scenario, as the result of the query, when the user instructs a designation to suspend the scenario;

a thirteenth step of adding to the suspending scenario a command job for re-starting the operating scenario, as the result of the query, when the user instructs a designation to continue the scenario, and a fourteenth step for determining what type of message to notify and to whom, and adding a mail job to the suspending scenario, wherein:

when to query the user is selected in the eighth step, the fifth to the seventh steps are executed; and when not to query the user is selected in the eighth step, the ninth to the fourteenth steps are executed.

4. The suspending scenario generation method according to claim 3, wherein the parameter inputted for generating the operating scenario is set as an initial parameter for generating the suspending scenario that suspends the operating scenario.

5. The suspending scenario generation method according to claim 3, further comprising the step of selecting, as the parameter for generating the suspending scenario, any one of:

suspending the operating scenario based on event information for suspending the operating scenario whose object is the storage device, in order to stop the storage device at a predetermined time that is planned in advance;

suspending the operating scenario based on event information issued when a resource constituting the storage device has changed; and suspending the operating scenario based on event information issued when a fault has occurred in a resource constituting the storage device.

6. The suspending scenario generation method according to claim 3, further comprising the step of selecting, as the parameter for generating the suspending scenario, one of compelling to terminate the operating command process currently being executed, and waiting for the operating command processing currently being executed to end, when suspending the operating scenario.

7. The suspending scenario generation method according to claim 3, further comprising the step designating by the user which step to suspend the operating scenario at, as the parameter for generating the suspending scenario.

8. A computer medium having a program embedded therein, the program for managing a management server, where the management server is provided with a job scheduler for executing an operating scenario for managing a storage device, the program controlling the management server to:

obtain a parameter input for a template for the operating scenario selected by a user;

generate the operating scenario based on the parameter inputted for the operating scenario;

after the parameter input for the operating scenario, obtain a parameter input for generating a suspending scenario for suspending execution of the operating scenario generated with the parameter;

generate the suspending scenario based on the parameter inputted for the suspending scenario; and wherein the program further controls the management server to execute a first step of reading a template for generating an operating scenario;

a second step of executing a wizard for obtaining input of a parameter for generating the operating scenario based on the template that was read;

a third step of registering the operating scenario generated based on the inputted parameter into a job scheduler so as to be executed at a predetermined date and time;

a fourth step of determining an event to trigger suspending the generated operating scenario, and adding an event job to the suspending scenario;

a fifth step of determining which job for which resource to suspend, and adding a command job to the suspending scenario;

a sixth step of determining what type of message to notify to whom, and adding a mail job to the suspending scenario; and a seventh step of registering the suspending scenario into the job scheduler so that the suspending scenario is executed at the time when the event occurs.

9. The computer medium according to claim 8, wherein the program further controls the management server to execute:

an eighth step of determining whether there is a suspending scenario whose object is the storage device relating to the execution of the generated operating scenario;

a ninth step of obtaining, from the job scheduler, information about the suspending scenario whose object is the storage device;

a tenth step of deleting the suspending scenario from the job scheduler; and an eleventh step of adding a command job for suspending the generated operating scenario, into the obtained suspending scenario; wherein:

as the result of determining in the eighth step, when there is no suspending scenario whose object is the storage device relating to executing the generated operating scenario, the fourth to the sixth steps are executed; and as the result of determining in the eighth step, when there is a suspending scenario whose object is the storage device relating to executing the generated operating scenario, the ninth to the eleventh steps are executed.

10. The computer medium according to claim 8, wherein the program further causes the management server to execute:

an eighth step ot selecting, as a parameter for generating the suspending scenario, one of temporarily stopping execution of the operating scenario and then suspending the operating scenario after an instruction by a user and suspending the operating scenario without querying the user;

a ninth step of determining an event to trigger suspending the generated operating scenario, and adding an event job to the suspending scenario;

a tenth step of adding to the suspending scenario a command job for temporarily stopping execution of the operating scenario;

an eleventh step of adding to the suspending scenario a command job for querying the user as to whether to suspend or continue the operating scenario;

a twelfth step of adding to the suspending scenario a command job for suspending the operating scenario, as the result of the query, when the user instructs a designation to suspend the scenario;

a thirteenth step of adding to the suspending scenario a command job for re-starting execution of the operating scenario, as the result of the query, when the user instructs a designation to continue the scenario; and a fourteenth step for determining what type of message to notify and to whom, and adding a mail job to the suspending scenario, wherein:

when to query the user is selected in the eighth step, the fourth to the sixth steps are executed; and when not to query the user is selected in the eighth step, the ninth to the fourteenth steps are executed.

11. A suspending scenario generation method which is executed in a storage system comprising a management server provided with a storage device and a job scheduler for executing an operating scenario for managing the storage device, the method comprising:

reading a template for generating an operating scenario;

executing a wizard for obtaining input of a parameter for generating the operating scenario based on the template that was read;

registering the operating scenario generated based on the inputted parameter into the job scheduler so as to be executed at a predetermined date and time;

determining an event to trigger suspending the generated operating scenario, and adding an event job into a suspending scenario;

determining which job for which resource to suspend, and adding a command job into the suspending scenario;

determining what kind of message to notify to whom, and adding a mail job into the suspending scenario;

registering the suspending scenario into the job scheduler so that the suspending scenario is executed at the time when the event occurs;

obtaining a list of existing suspending scenarios from the job scheduler;

determining whether there already exists a suspending scenario whose object is the same resource;

adding an event job definition, the command job, and the mail job, when a result from the determining indicates that there is no suspending scenario whose object is the same resource;

when there is a suspending scenario whose object is the same resource, obtaining job definition information of the suspending scenario, deleting the scenario from the job scheduler, and inserting a command job definition for suspending the operating scenario; and after that, registering the generated suspending scenario file into the job scheduler.

* * * * *